United States Patent [19]

Savage et al.

[11] 4,248,383

[45] Feb. 3, 1981

[54] WASHER SYSTEM FOR TRANSPARENT SURFACES ON A VEHICLE

[75] Inventors: Jack W. Savage, Centerville; Keith H. Carpenter, Kettering, both of Ohio

[73] Assignee: General Motors Corporation, Detroit, Mich.

[21] Appl. No.: 83,103

[22] Filed: Oct. 9, 1979

[51] Int. Cl.³ .............................................. B60S 1/46
[52] U.S. Cl. .............................................. 239/284 A
[58] Field of Search ....................... 239/284 R, 284 A; 15/250 A, 250 R, 250.01, 250.02

[56] References Cited

U.S. PATENT DOCUMENTS

| | | | |
|---|---|---|---|
| 3,113,704 | 12/1963 | Fingerfoot | 239/284 R X |
| 3,169,676 | 2/1965 | Hanselmann | 239/284 R X |
| 4,026,468 | 5/1977 | Tinder | 239/284 R X |

FOREIGN PATENT DOCUMENTS 2324244  12/1974  Fed. Rep. of Germany ...... 239/284 A Primary Examiner—Richard A. Schacher
Attorney, Agent, or Firm—Donald F. Scherer

[57] ABSTRACT

A washer system for transparent surfaces such as headlamp lenses and windshields has a liquid delivery chamber of a predetermined volume which is supplied with liquid through a one-way valve from a liquid storage chamber having a larger predetermined volume. The liquid in the delivery chamber is expelled from the chamber through passages and nozzles by air pressure which is stored at high pressure in an accumulator. The air in the accumulator is controlled for selective delivery by the operator. The accumulator is replenished with air automatically by an air compressor. A pneumatic delivery passage is connected between the top of the liquid delivery chamber and the nozzle passages to assist in exhausting the liquid in the passages through the nozzles and after the liquid is expended to permit air in the chamber to escape during refilling of the chamber with liquid.

4 Claims, 1 Drawing Figure

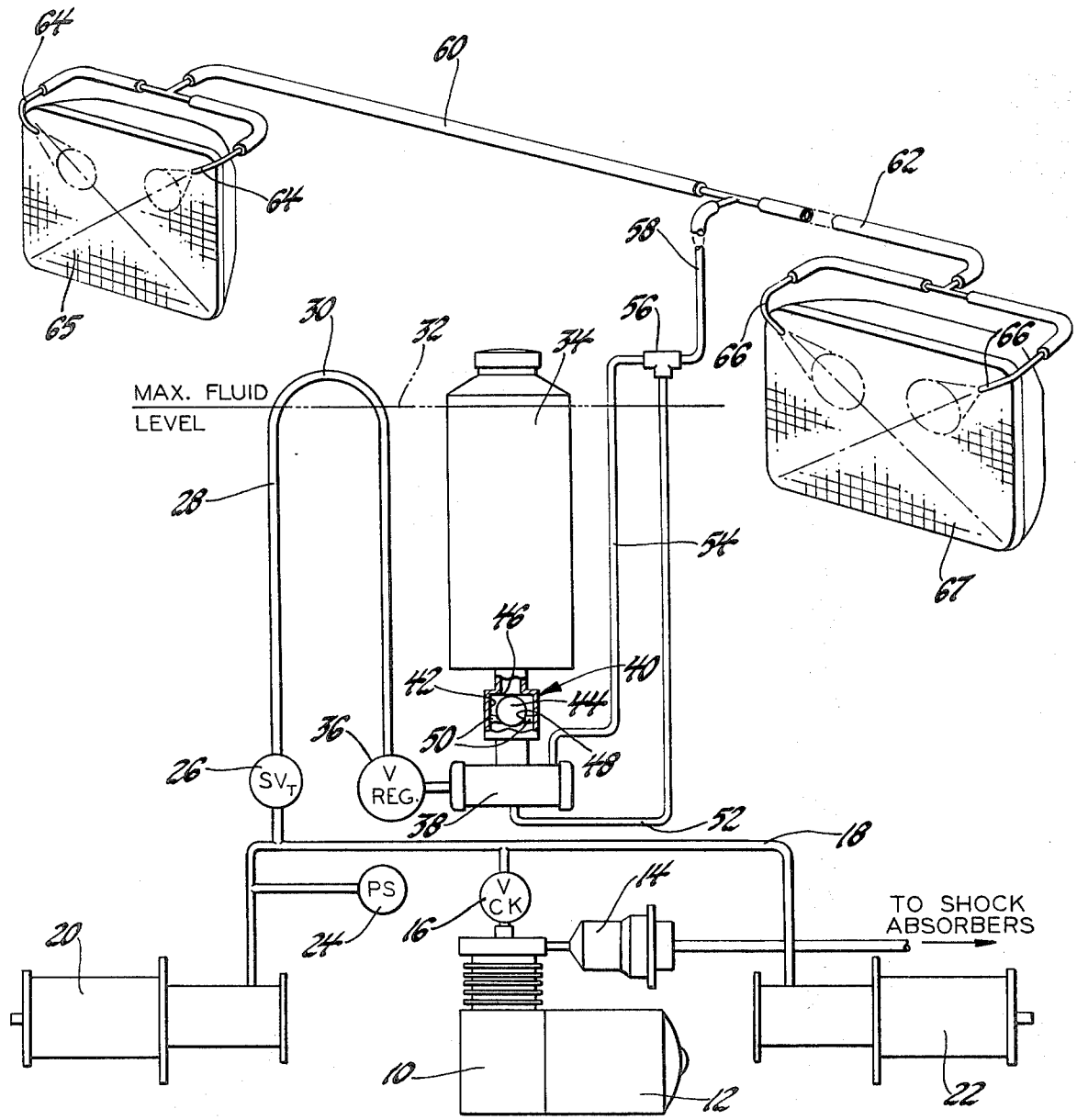

WASHER SYSTEM FOR TRANSPARENT SURFACES ON A VEHICLE

This invention relates to washer systems and more particularly to washer systems for transparent surfaces on vehicles.

There are many prior art devices for cleaning vehicle windshields and/or headlamps which utilize pressurized liquid as a cleaning agent. Some of these systems include (a) the use of a chamber which is filled with a predetermined volume of liquid which is dispensed by air pressure and (b) a large liquid storage member which automatically refills the smaller chamber through a one-way valve mechanism. However, these prior art devices do not provide an escape route which permits the air in the small chamber to escape while the chamber is being refilled.

The present invention utilizes a predetermined volume delivery chamber which is automatically filled from a larger liquid reservoir. However, the present invention has a pneumatic delivery passage connected between the top of the delivery chamber and a liquid delivery passage which is connected to the dispensing nozzles. The pneumatic delivery passage provides two functions. As previously, mentioned, it provides an escape route, however, during the dispensing cycle the pneumatic delivery passage also provides some aspiration effect in the liquid delivery passages.

It is therefore an object of this invention to provide an improved washing system for transparent surfaces wherein a predetermined volume of liquid is dispensed onto the surface to be cleaned at high velocity by air pressure.

It is another object of this invention to provide an improved washing system for transparent surfaces wherein a predetermined volume of liquid is dispensed from a chamber onto the surface to be cleaned, followed by air flow across the surface, and wherein an air passage is connected to the top of the chamber to permit the air therein to escape during refilling of the chamber.

These and other objects and advantages of the present invention will be more apparent from the following description and drawing which is a diagrammatic representation of a washer system incorporating the present invention.

Referring to the drawing, there is seen a conventional air compressor 10 driven by a conventional electric motor 12. The air compressor 10 is suitable for delivering pressurized air through a drier 14 for use in pneumatic shock absorbers which are well-known devices. The compressor 10 also supplies pressurized air through a check valve 16 to a passage 18 which is connected to a pair of energy absorbers 20 and 22.

As is well-known, the energy absorbers have a pressurized gas chamber which enforces their return to a "rest" position after they have absorbed an impact. For example, the energy absorbers 20 and 22 may be interconnected between the frame and front bumper of a vehicle, not shown. If the bumper is hit by another vehicle, the energy absorbers 20 and 22 will permit relative motion between the bumper and frame to absorb the impact energy. After the impact, the energy absorbers 20 and 22 are returned to their "at rest" position by a pressurized gas such as air in a well-known manner.

These energy absorbers, therefore, can provide an accumulator to be used with other systems as long as there is present a device such as air compressor 10 to refill the gas storage chamber on the energy absorber. The passage 18 is also connected to a pressure switch 24 which senses the pressure therein and is operative in a conventional manner to energize the electric motor 12 whenever the pressure in passage 18 is below a desired level, for example, 150 psi, and to discontinue operation of the electric motor 12 whenever the pressure in passage 18 reaches an upper limit, for example, 185 psi. The electric motor 12 can also be operated in a conventional manner by the pneumatic shock absorber system, and such controls are well-known.

The passage 18 is connected to an operator controlled solenoid valve 26 which, in turn, is connected to an air delivery passage 28. It will be noted that the uppermost point 30 of the air delivery passage 28 is above the maximum fluid level 32 which is permitted in a liquid storage chamber 34.

The air delivery passage 28 is also connected to a pressure reducing or downstream pressure regulator valve 36 which is operable to permit the flow of air therethrough up to a maximum limited pressure, such as 60 psi, which is less than the air pressure in passage 28 when the accumulator is at full charge, such as 185 psi. The outlet of regulator valve 36 is connected to a liquid delivery chamber 38 which has a predetermined volume which is preferably 1/25 or less than the volume of liquid storage chamber 34. The liquid delivery chamber 38 and the liquid storage chamber 34 are interconnected through a one-way check valve generally designated 40, which includes a chamber 42 and a ball 44. The chamber 42 has an upper seat 46 and a lower seat 48. The lower seat 48 has fluid passages 50 formed therethrough which permit the passage of liquid from storage chamber 34 to liquid delivery chamber 38. However, when the liquid delivery chamber 38 is pressurized by air, the ball 44 will move into contact with the upper seat 46 so that reverse flow from liquid delivery chamber 38 to liquid storage chamber 34 is not possible.

The lower surface of liquid delivery chamber 38 is connected to liquid delivery passage 52 and the upper or topmost part of the liquid delivery chamber 38 is connected to a pneumatic delivery passage 54. The passages 52 and 54 are united at a T-fitting 56 at a level above the maximum fluid level 32. The other leg of T 56 is connected to a washer passage 58 which is connected by equal lengths of tubing passages 60 and 62 to headlamp dispensing nozzles 64 on the left headlamp 65 and nozzles 66 on the right headlamp 67.

Assuming that the headlamps 65 and 67 become encrusted with salt or mud or other road debris, the operator can clean the headlamps merely by energizing the solenoid valve 26. Assuming that the system pressure in passage 18 is above 60 psi, the regulator valve 36 will limit the system pressure to this maximum amount permitting the pressurized air to operate on the liquid delivery chamber 38. The check valve 40 will close against reverse flow and the liquid in chamber 38 will be dispensed through passage 52 to passages 58, 60 and 62. From passage 60, the liquid will be forced onto headlamp 65 at a very high velocity and the liquid in passage 62 will be dispensed onto headlamp 67 at a very high velocity. The air in delivery chamber 38 will pass through passage 54 and into passage 58 through T 56. As the air passes through T 56 at high velocity, an aspirator effect is developed to assist in removing liquid from chamber 38. With solenoid valve 26 still energized by the operator after all liquid has been removed from chamber 38, air at low pressure, such as 25 psi, supplied by air compressor 10 will flow out through nozzles 64 and 66 blowing clear any residual fluid that might freeze therein. When the operator releases the control for solenoid valve 26, the valve 26 will close and the remaining pressurized air downstream of solenoid valve 26 will flow out of the passages 60 and 62 to provide some drying effect for the headlamps 65 and 67. The pressure in delivery chamber 38 will eventually subside permitting the one-way valve 40 to open so that the delivery chamber 38 can be refilled from the liquid storage chamber 34.

As liquid flows into the delivery chamber 38, air trapped therein can flow upward through passage 54 and out through passages 58, 60 and 62. This additional air flow will help ensure that there is no fluid left in the passages 58, 60 and 62 that might freeze therein during cold weather conditions. Preferably, the liquid in the system includes a nonfoaming alcohol base so that the freezing temperature thereof is sufficiently low.

As was previously mentioned, the delivery chamber is approximately 1/25 of the volume of storage chamber 34. By way of further example, the capacity of the delivery chamber can be 0.05 gallons while the storage chamber volume can be 1.25 gallons. This will permit twenty-five cleanings each time the storage chamber is completely filled. The system has proven effective in removing mud film or salt film from a headlamp lens.

For test purposes the following conditions prevailed (1) a washer system having a maximum limited pressure of 40 psi and a five second washing cycle and (2) a conventional headlamp covered with a mud film so that only 2.3% of the light capacity would pass through the lens. After four successive five second cleaning cycles, the lens permitted the passage of 61% of the light capacity. Similar tests were run with a salt film which began with a light transmission rate of 3.8% and after four successive five second cleaning/washing cycles, had a light transmission rate of 85%. In each of the above tests, water was used as the cleaning solution and each of the nozzles 64 and 66 had a 0.036 inch diameter. While the headlamp washer system is shown as utilizing energy absorbers as pneumatic storage chambers, it is possible to utilize a separate accumulator which may be charged from an onboard compressor or from a stationary air source. It will also be obvious to those skilled in the art that while the cleaning system is shown as being utilized between the headlamps it is equally possible to install the nozzles 64 and 66 on windshield wiper arm assemblies in a well-known manner so that windshields can also be cleaned utilizing the present system.

The embodiments of the invention in which an exclusive property or privilege is claimed are defined as follows:

1. A vehicle headlamp washer system for use in a vehicle having a pneumatic storage chamber and means for maintaining a predetermined pressure level therein, said headlamp cleaning system comprising; headlamp nozzles, a liquid storage reservoir; a delivery chamber having a measured volume, a one-way valve permitting the gravity flow of liquid from said liquid storage reservoir to said delivery chamber; means connecting the pneumatic storage chamber and said delivery chamber including an operator controlled valve means for controlling communication between the pneumatic storage chamber and said delivery chamber; liquid passage means for delivering liquid from said delivery chamber to said headlamp nozzles in response to operation of said valve means; and pneumatic delivery passage means connected between the top of said delivery chamber and said liquid passage means and being operable to provide an air escape route from said delivery chamber through said headlamp nozzles when liquid from said liquid storage reservoir is being delivered by gravity flow through said one-way valve to said delivery chamber.

2. A vehicle headlamp washer system for use in a vehicle having pressurized gas filled energy absorbing means and compressor means for maintaining a predetermined pressure level therein, said headlamp cleaning system comprising; headlamp nozzles, a liquid storage reservoir; a delivery chamber having a measured volume, a one-way valve permitting the gravity flow of liquid from said liquid storage reservoir to said delivery chamber; means connecting the gas filled energy absorbing means and said delivery chamber including pressure regulator valve means for limiting the maximum pressure operable on said delivery chamber, and operator controlled electrical solenoid valve means for controlling communication between the gas filled energy absorbing means and said pressure regulator valve means; liquid passage means for delivering liquid from said delivery chamber to said headlamp nozzles in response to operation of said valve means; and gas delivery passage means connected between the top of said delivery chamber and said liquid passage means and being operable to provide a gas escape route from said delivery chamber through said headlamp nozzles when liquid from said liquid storage reservoir is being delivered by gravity flow through said one-way valve to said delivery chamber.

3. A washing system for use on a transparent surface on a vehicle having a pneumatic storage chamber and means for maintaining a predetermined pressure level therein, said washing system comprising; fluid delivery nozzle means, a liquid storage reservoir; a delivery chamber having a measured volume, a one-way valve permitting the gravity flow of liquid from said liquid storage reservoir to said delivery chamber; means connecting the pneumatic storage chamber and said delivery chamber including operator controlled valve means for controlling communication between the pneumatic storage chamber and said delivery chamber; liquid passage means for delivering liquid from said delivery chamber to said fluid delivery nozzle means in response to operation of said valve means; and pneumatic delivery passage means connected between the top of said delivery chamber and said liquid passage means and being operable to provide an air escape route from said delivery chamber through said fluid delivery nozzle means when liquid from said liquid storage reservoir is being delivered by gravity flow through said one-way valve to said delivery chamber.

4. A washer system for transparent surfaces on a vehicle having a pneumatic storage system and means for maintaining a predetermined pressure level therein, said washer system comprising; a liquid storage reservoir having a predetermined volume, a delivery chamber having a predetermined volume substantially less than the volume of said liquid storage reservoir; one-way valve means for permitting the gravity flow of liquid from said liquid storage reservoir to said delivery chamber and for preventing liquid flow from said delivery chamber to said liquid reservoir; pneumatic passage means for communicating between the pneumatic storage chamber and said delivery chamber and having a portion of said pneumatic passage means at a level higher than the maximum liquid level obtainable in said liquid storage chamber; pressure regulator means in said pneumatic passage means adjacent said delivery chamber for maintaining a maximum pressure in said delivery chamber; operator controlled valve means disposed in said pneumatic passage means upstream of said pressure regulator means for controlling communication between the pneumatic storage chamber and said pressure regulator means; liquid passage means connected between said delivery chamber and nozzles for delivering liquid from said delivery chamber to said transparent surfaces when said operator controlled valve means is operated to connect said pneumatic storage chamber with said delivery chamber through said pressure regulator means; and pneumatic delivery passage means connected between the top of said delivery chamber and said liquid passage means at a position where said liquid passage means is at a level above the highest liquid level in the liquid storage reservoir, said pneumatic delivery passage means being operable to provide an air escape route from said delivery chamber through said nozzles when liquid from said liquid storage reservoir is being delivered by gravity flow through said one-way valve means to said delivery chamber.

* * * * *